United States Patent
Lin et al.

(10) Patent No.: US 11,443,252 B2
(45) Date of Patent: Sep. 13, 2022

(54) MULTI-OBJECTIVE OPERATION CONTROL METHOD FOR MICRO ENERGY GRID

(71) Applicant: SOUTH CHINA UNIVERSITY OF TECHNOLOGY, Guangdong (CN)

(72) Inventors: Xiaoming Lin, Guangdong (CN); Yongjun Zhang, Guangdong (CN)

(73) Assignee: SOUTH CHINA UNIVERSITY OF TECHNOLOGY, Guangzhou (CN)

(*) Notice: Subject to any disclaimer, the term of this patent is extended or adjusted under 35 U.S.C. 154(b) by 6 days.

(21) Appl. No.: 17/042,948

(22) PCT Filed: Oct. 31, 2018

(86) PCT No.: PCT/CN2018/113243
§ 371 (c)(1),
(2) Date: Sep. 29, 2020

(87) PCT Pub. No.: WO2019/184344
PCT Pub. Date: Oct. 3, 2019

(65) Prior Publication Data
US 2021/0125114 A1 Apr. 29, 2021

(30) Foreign Application Priority Data
Mar. 29, 2018 (CN) .......................... 201810268635.8

(51) Int. Cl.
*G06Q 10/04* (2012.01)
*G06Q 50/06* (2012.01)
(Continued)

(52) U.S. Cl.
CPC ............. *G06Q 10/04* (2013.01); *G06Q 50/06* (2013.01); *H02J 3/06* (2013.01); *H02J 3/46* (2013.01); *H02J 2203/20* (2020.01)

(58) Field of Classification Search
CPC . G06Q 10/04; G06Q 50/06; H02J 3/06; H02J 3/46; H02J 2203/20; H02J 3/466;
(Continued)

(56) References Cited

U.S. PATENT DOCUMENTS

| 2013/0024014 A1 | 1/2013 | Sharma et al. |
| 2015/0311713 A1* | 10/2015 | Asghari ............... H02J 3/00 700/297 |

FOREIGN PATENT DOCUMENTS

| CN | 104463374 | 3/2015 |
| CN | 104808489 | 7/2015 |

(Continued)

OTHER PUBLICATIONS

"International Search Report (Form PCT/ISA/210) of PCT/CN2018/113243," dated Jan. 31, 2019, pp. 1-4.

*Primary Examiner* — Tejal Gami
(74) *Attorney, Agent, or Firm* — JCIPRNET

(57) ABSTRACT

The present invention disclosed a multi-objective operation control method for a micro energy grid, comprising the specific steps of: (1) establishing optimization objectives of the micro energy grid, the optimization objectives comprising comprehensive income maximization and comprehensive energy utilization rate maximization; (2) using GAMS software to solve for an optimal solution and a worst solution for each optimization objective; (3) processing the optimization objectives by means of a weighting method, uniformly changing a weighting coefficient, and acquiring a Pareto frontier by the GAMS software; (4) acquiring reference satisfaction levels of Pareto optimal solutions according to a fuzzy membership degree, and selecting the Pareto optimal solution having the maximum reference satisfaction level as an optimal compromise solution; and (5) executing scheduling of the micro energy grid according to the optimal compromise solution.

4 Claims, 2 Drawing Sheets

(51) Int. Cl.
*H02J 3/06* (2006.01)
*H02J 3/46* (2006.01)

(58) Field of Classification Search
CPC ...... H02J 2300/28; Y02E 40/70; Y02E 60/00; Y04S 10/50; Y04S 40/20
See application file for complete search history.

(56) References Cited

FOREIGN PATENT DOCUMENTS

| | | |
|---|---|---|
| CN | 106712111 | 5/2017 |
| CN | 106920177 | 7/2017 |
| CN | 108491976 | 9/2018 |

* cited by examiner

MULTI-OBJECTIVE OPERATION CONTROL METHOD FOR MICRO ENERGY GRID

CROSS-REFERENCE TO RELATED APPLICATION

This application is a 371 of international application of PCT application serial no. PCT/CN2018/113243, filed on Oct. 31, 2018, which claims the priority benefit of China application no. 201810268635.8, filed on Mar. 29, 2018. The entirety of each of the above mentioned patent applications is hereby incorporated by reference herein and made a part of this specification.

TECHNICAL FIELD

The present invention relates to an optimized operation technology for a micro energy grid, and more particularly, to a multi-objective operation control method for a micro energy grid.

BACKGROUND

At present, fossil energy is increasingly depleted and environmental pollution is becoming increasingly severe, so that an energy structure faces a challenge of transformation and upgrading. A micro energy grid, which integrates renewable energies, utilizes various energies for complementary purpose, and increases the efficiency of energy utilization, is an effective way to realize sustainable energy development. Micro energy grid operation reasonably arranges operations of each energy device inside the micro energy grid with different objectives on the premise of meeting security constraints. In current research, optimized operation of the micro energy grid mainly aims at minimizing the operation cost, but a single-objective optimized scheduling solution is difficult to adapt to a complicated comprehensive energy supply and use environment and a constantly transformed and upgraded energy structure. The micro energy grid provides a platform for realizing comprehensive utilization of multiple energies, and the energy utilization rate is an effective index to reflects the efficiency and the energy saving property of the micro energy grid. It is an important way to realize sustainable energy development which set the energy utilization rate as an optimized objective of the micro energy grid and pursue efficient energy utilization.

In view of the above problems, the present invention provides a multi-objective operation control method for a micro energy grid, which can effectively balance economic cost and efficiency of the micro energy grid operation.

SUMMARY

The objective of the present invention lies in a control problem of micro energy grid operation, which can not only improve economic gains of the micro energy grid operation, but also improve the efficiency of the operation.

In order to achieve the above objective, the present invention provides a multi-objective operation control method for a micro energy grid, which comprises the following steps:

(1) establishing optimization objectives of the micro energy grid, which comprises comprehensive income maximization and comprehensive energy utilization rate maximization;

(2) using GAMS software to solve for an optimal solution and a worst solution for each optimization objective;

(3) processing the optimization objectives by means of a weighting method, uniformly changing a weighting coefficient, and acquiring a Pareto frontier by the GAMS software;

(4) acquiring reference satisfaction levels of Pareto optimal solutions according to a fuzzy membership degree, and selecting the Pareto optimal solution with the maximum reference satisfaction level as an optimal compromise solution; and (5) executing scheduling of the micro energy grid according to the optimal compromise solution.

The comprehensive income $f_1$ comprises an energy service income $C_{Ser}$, an energy trade income $C_{Trade}$, an operation and maintenance cost $C_{OM}$ and a carbon tax cost $C_{CO2}$:

$$f_1 = C_{Ser} + C_{Trade} - C_{OM} - C_{CO2}$$

$$\begin{cases} C_{Ser} = \sum_{t=1}^{T}(c_{e,t}L_{e,t} + c_{h,t}L_{h,t} + c_{g,t}L_{g,t})\Delta t \\ C_{Trade} = \sum_{t=1}^{T}(c_{e,t}^{sell}S_{e,t}^{sell} - c_{e,t}^{buy}S_{e,t}^{buy} - c_{g}^{buy}S_{g,t}^{buy})\Delta t \\ C_{OM} = \sum_{t=1}^{T}\left[\sum_{n=1}^{N}c_{d,n}P_{n,t}^{in} + \sum_{k=1}^{K}c_{s,k}(Q_{k,t}^{dis} + Q_{k,t}^{ch})\right] \\ C_{CO2} = \sum_{t=1}^{T}c_c(a_e S_{e,t}^{buy} + a_g S_{g,t}^{buy})\Delta t \end{cases}$$

wherein $\Delta t$ is an optimization time interval, and T is a total optimization time period; $L_{e,t}$, $L_{h,t}$ and $L_{g,t}$ are powers of electricity, heat and natural gas of a user during a time period t respectively, and a value range of t is 1 to T; $c_{e,t}$, $c_{h,t}$ and $c_{g,t}$ are prices of electricity, heat and natural gas services respectively provided by the micro energy grid to the user during the time period t; $S_{e,t}^{buy}$, $S_{e,t}^{sell}$ and $S_{g,t}^{buy}$ are the power of electricity bought from an electricity grid by the micro energy grid and the power of electricity sold to the electricity grid from the micro energy grid and the power of the natural gas bought from a gas grid respectively during the time period t; $c_{e,t}^{buy}$, $c_{e,t}^{sell}$ and $c_{g,t}^{buy}$ are the price of electricity bought from the electricity grid by the micro energy grid and the price of electricity sold to the electricity grid from the micro energy grid and the price of the natural gas bought from a gas grid respectively during the time period t; N is a total number of energy conversion devices, K is a total number of energy storage devices, $c_{d,n}$ and $c_{s,k}$ are operation and maintenance coefficients of an $n^{th}$ energy conversion device and a eth energy storage device respectively, a value of n is 1 to N, and a value of k is 1 to K; $P_{n,t}^{in}$, $Q_{k,t}^{ch}$, and $Q_{k,t}^{dis}$ are an input power of the $n^{th}$ energy conversion device and charging and discharging powers of the $k^{th}$ energy storage device respectively during the time period t; $a_e$ and $a_g$ are $CO_2$ emission coefficients of electricity and natural gas respectively; and cc is a unit carbon emission cost.

The comprehensive energy utilization rate $f_2$ is:

$$f_2 = \frac{\sum_{t=1}^{T}(L_{e,t} + L_{h,t} + L_{g,t} + S_{e,t}^{sell})}{\sum_{t=1}^{T}(S_{e,t}^{buy} + S_{g,t}^{buy} + W_{e,t})}$$

wherein $W_{e,t}$ is the generated output of wind electricity during the time period t.

The step (3) comprises:

(3-1) standardizing the optimization objectives $f_1$ and $f_2$, and executing weighting processing to acquire an optimization objective function:

$$\max\left[w\frac{f_1 - F_1^{min}}{F_1^{max} - F_1^{min}} + (1-w)\frac{f_2 - F_2^{min}}{F_2^{max} - F_2^{min}}\right]$$

wherein $F_1^{max}$ and $F_1^{min}$, as well as $F_2^{max}$ and $F_2^{min}$ are the optimal solutions and the worst solutions of the optimization objectives $f_1$ and $f_2$ respectively; w is a weight of the optimization objective $f_1$, and the value range of w is [0,1]; and (1−w) is a weight of the optimization objective $f_2$;

(3-2) uniformly taking J values of the weighting coefficient w in the range of [0,1], where J is a set value; and (3-3) for each weighting coefficient value, acquiring Pareto optimal solutions of the optimization objective function in step (3-1) by the GAMS software, and J Pareto optimal solutions forming the Pareto frontier.

The fuzzy membership degree is:

$$\gamma_{i,j} = \frac{F_i^{max} - f_{i,j}}{F_i^{max} - F_i^{min}}$$

wherein $f_i$ and $\gamma_{i,j}$ respectively are an objective function value and a fuzzy membership degree of the $i^{th}$ optimization objective of the $j^{th}$ Pareto optimal solution, a value range of i is 1 or 2, and a value range of j is 1 to J; and the reference satisfaction level of the Pareto optimal solution is:

$$\zeta_j = \frac{\sum_{i=1}^{2} \gamma_{i,j}}{\sum_{j=1}^{J}\sum_{i=1}^{2} \gamma_{i,j}}$$

wherein $\zeta_j$ is the reference satisfaction level of the $j^{th}$ Pareto optimal solution.

Compared with the prior art, the multi-objective operation control method for the micro energy grid provided by the present invention can execute multi-objective optimization on the comprehensive income and the comprehensive energy utilization rate of the micro energy grid, thereby ensuring high economic gains of the micro energy grid operation and increasing the comprehensive energy utilization rate of the micro energy grid at the same time.

DETAILED DESCRIPTION

The specific embodiments of the present invention are further described hereinafter with reference to the accompanying drawings and the embodiments, but the embodiments of the present invention are not limited thereto. It should be noted that anything not specifically described in further detail can be realized by those skilled in the art with reference to the prior art.

Figure 1:
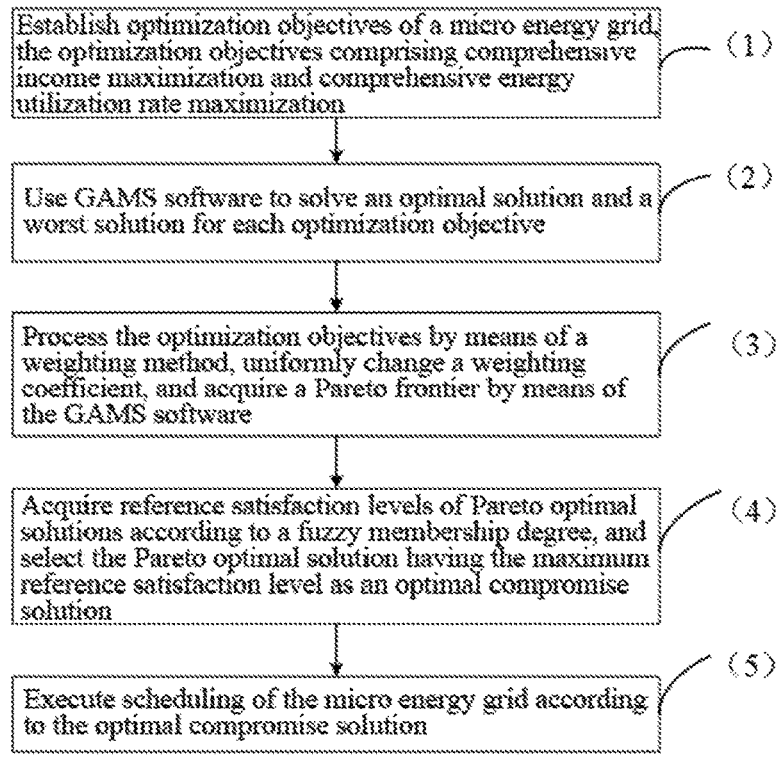
FIG. 1 is a schematic diagram showing steps of a multi-objective operation control method for a micro energy grid.

As shown in FIG. 1, a multi-objective operation control method for a micro energy grid provided in the embodiment of the present invention comprises the following steps:

(1) establishing optimization objectives of the micro energy grid, which comprises comprehensive income maximization and comprehensive energy utilization rate maximization;

(2) using GAMS software to solve for an optimal solution and a worst solution for each optimization objective;

(3) processing the optimization objectives by means of a weighting method; uniformly changing a weighting coefficient, and acquiring a Pareto frontier by the GAMS software;

(4) acquiring reference satisfaction levels of Pareto optimal solutions according to a fuzzy membership degree, and selecting the Pareto optimal solution with the maximum reference satisfaction level as an optimal compromise solution; and (5) executing scheduling of the micro energy grid according to the optimal compromise solution.

The comprehensive income $f_1$ comprises an energy service income $C_{Ser}$, an energy trade income $C_{Trade}$, an operation and maintenance cost $C_{OM}$ and a carbon tax cost $C_{CO2}$:

$$f_1 = C_{Ser} + C_{Trade} - C_{OM} - C_{CO2}$$

$$\begin{cases} C_{Ser} = \sum_{t=1}^{T}(c_{e,t}L_{e,t} + c_{h,t}L_{h,t} + c_{g,t}L_{g,t})\Delta t \\ C_{Trade} = \sum_{t=1}^{T}\left(c_{e,t}^{sell}S_{e,t}^{sell} - c_{e,t}^{buy}S_{e,t}^{buy} - c_{g}^{buy}S_{g,t}^{buy}\right)\Delta t \\ C_{OM} = \sum_{t=1}^{T}\left[\sum_{n=1}^{N}c_{d,n}P_{n,t}^{in} + \sum_{k=1}^{K}c_{s,k}(Q_{k,t}^{dis} + Q_{k,t}^{ch})\right] \\ C_{CO2} = \sum_{t=1}^{T}c_c\left(a_e S_{e,t}^{buy} + a_g S_{g,t}^{buy}\right)\Delta t \end{cases}$$

wherein $\Delta t$ is an optimization time interval, and T is a total optimization time period; $L_{e,t}$, $L_{h,t}$ and $L_{g,t}$ are powers of electricity, heat and natural gas of a user during a time period t respectively, and a value range of t is 1 to T; $c_{e,t}$, $c_{h,t}$ and $c_{g,t}$ are prices of electricity, heat and natural gas services respectively provided by the micro energy grid to the user during the time period t; $S_{e,t}^{buy}$, $S_{e,t}^{sell}$ and $S_{g,t}^{buy}$ are a power of electricity bought from an electricity grid by the micro energy grid and a power of electricity sold to the electricity grid from the micro energy grid and a power of the natural gas bought from a gas grid respectively during the time period t; $c_{e,t}^{buy}$, $c_{e,t}^{sell}$ and $c_{g,t}^{buy}$ are a price of electricity bought from the electricity grid by the micro energy grid and a price of electricity sold to the electricity grid from the micro energy grid and a price of the natural gas bought from a gas grid respectively during the time period t; N is a total number of energy conversion devices, K is a total number of energy storage devices, $c_{d,n}$ and $c_{s,k}$ are operation and maintenance coefficients of an $n^{th}$ energy conversion device and a $k^{th}$ energy storage device respectively, a value of n is 1 to N, and a value of k is 1 to K; $P_{n,t}^{in}$, $Q_{k,t}^{ch}$, and $Q_{k,t}^{dis}$ are an input power of the $n^{th}$ energy conversion device and charging and discharging powers of the $k^{th}$ energy storage device during the time period t respectively; $a_e$ and $a_g$ are $CO_2$ emission coefficients of electricity and natural gas respectively; and cc is a unit carbon emission cost.

The comprehensive energy utilization rate $f_2$ is:

$$f_2 = \frac{\sum_{t=1}^{T}(L_{e,t} + L_{h,t} + L_{g,t} + S_{e,t}^{sell})}{\sum_{t=1}^{T}(S_{e,t}^{buy} + S_{g,t}^{buy} + W_{e,t})}$$

where $W_{e,t}$ is the generated output of wind electricity during time period t.

Step (3) comprises:

(3-1) standardizing the optimization objectives $f_1$ and $f_2$, and executing weighting processing to acquire an optimization objective function:

$$\max\left[w\frac{f_1 - F_1^{min}}{F_1^{max} - F_1^{min}} + (1-w)\frac{f_2 - F_2^{min}}{F_2^{max} - F_2^{min}}\right]$$

where $F_1^{max}$ and $F_1^{min}$, as well as $F_2^{max}$ and $F_2^{min}$ respectively are the optimal solutions and the worst solutions of the optimization objectives $f_1$ and $f_2$; w is the weight of the optimization objective $f_1$, a value range of w is [0,1]; and (1−w) is the weight of the optimization objective $f_2$;

(3-2) uniformly taking J values of the weighting coefficient w in the range of [0,1], where J is a set value; and (3-3) for each weighting coefficient value, acquiring Pareto optimal solutions of the optimization objective function in step (3-1) by the GAMS software, and J Pareto optimal solutions forming the Pareto frontier.

The fuzzy membership degree is:

$$\gamma_{i,j} = \frac{F_i^{max} - f_{i,j}}{F_i^{max} - F_i^{min}}$$

where $f_{i,j}$ and $\gamma_{i,j}$ respectively are the objective function value and the fuzzy membership degree of the $i^{th}$ optimization objective of the $j^{th}$ Pareto optimal solution; a value range of i is 1 or 2, and a value range of j is 1 to J; and The reference satisfaction level of the Pareto optimal solution is:

$$\zeta_j = \frac{\sum_{i=1}^{2}\gamma_{i,j}}{\sum_{j=1}^{J}\sum_{i=1}^{2}\gamma_{i,j}}$$

where $\zeta_j$ is a reference satisfaction level of the $j^{th}$ Pareto optimal solution.

Figure 2:
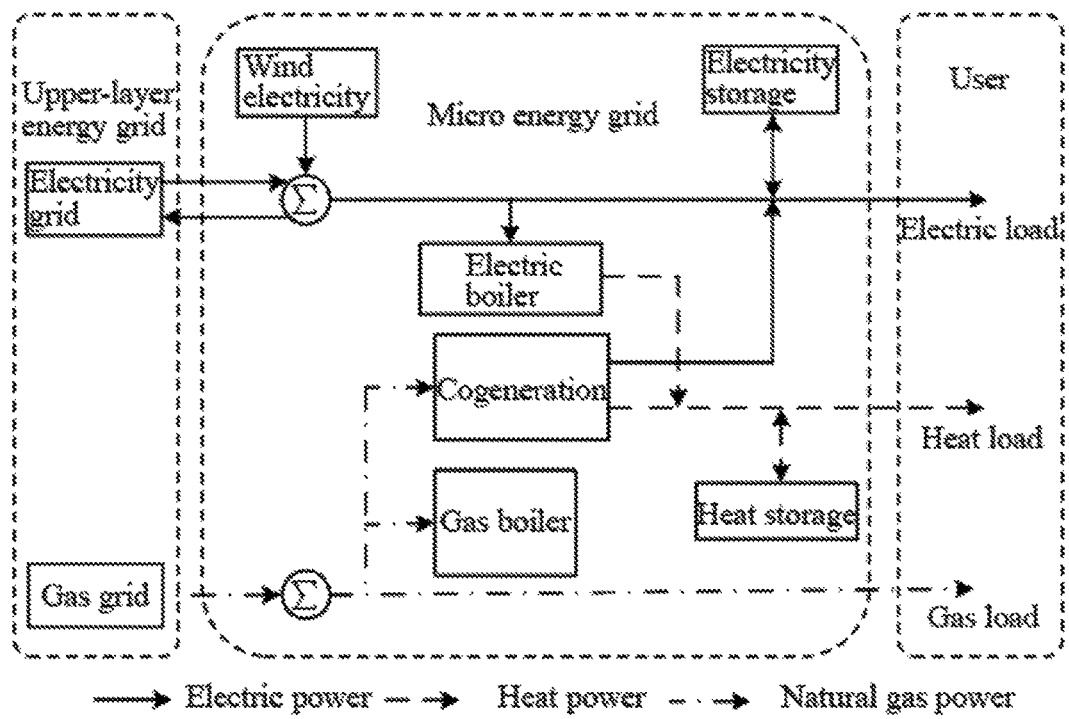
FIG. 2 is a structure diagram of a typical micro energy grid.

Taking a typical micro energy grid as example, a structure of the micro energy grid is shown in FIG. 2, which comprises three energy conversion devices, cogeneration, electric boiler and gas boiler, two energy storage devices, electricity storage and heat storage; the renewable energy refers to wind power generation.

Figure 3:
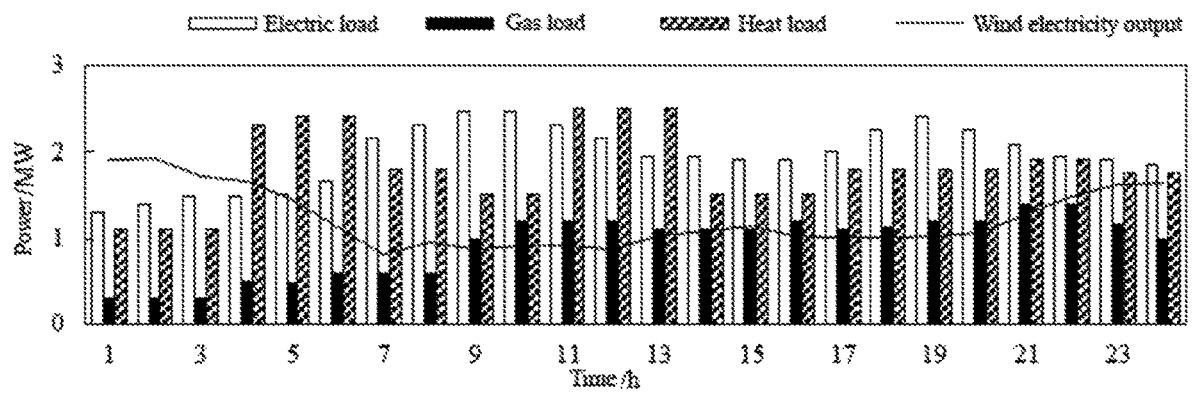
FIG. 3 is a line chart of electricity, heat, natural gas and wind electricity output.

An optimized operation time interval is 1 hour, and there are 24 optimization time periods. Curves of an electric load, a heat load, a natural gas load and a wind electricity output are shown in FIG. 3.

The optimal solution and the worst solution with the comprehensive income maximization and the comprehensive energy utilization rate maximization as objectives are solved respectively, as shown in Table 1. The optimal solution of the comprehensive income is 42,900 Yuan, whereas the worst solution of the comprehensive income is 25,900 Yuan. The optimal solution of the comprehensive energy utilization rate is 90.0%, and the worst solution of the comprehensive energy utilization rate is 82.4%.

Figure 4:
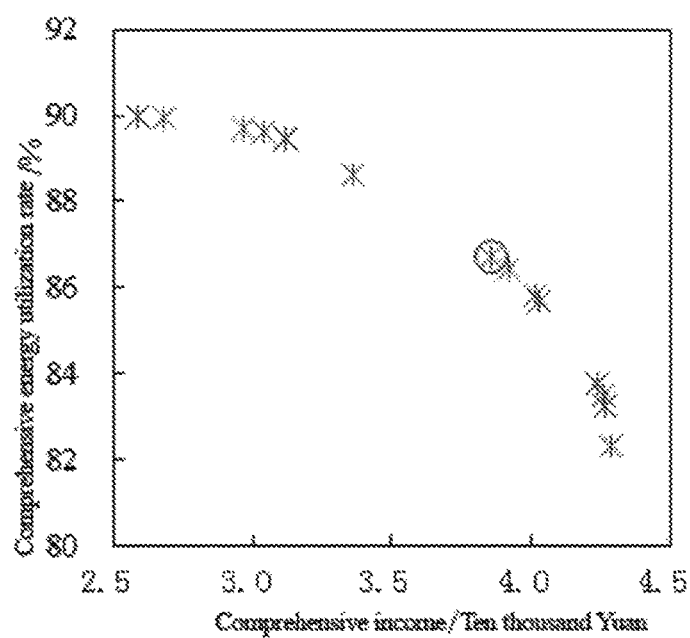
FIG. 4 shows a Pareto frontier of multi-objective optimized operation.

The weighting coefficient w in the range of [0,1] is taken uniformly as 0, 0.05, 0.10, . . . , 0.095, and 1, comprising 21 values in total. The Pareto frontier acquired by the GAMS is shown in FIG. 4.

The reference satisfaction levels of Pareto optimal solutions are calculated, and the one with maximum reference satisfaction level is selected as the optimal compromised solution. The optimal compromised solution is the point marked by a circle in FIG. 4. Optimization results are shown in Table 1. The comprehensive income of the optimal compromise solution is 3.86, and the energy utilization rate of the optimal compromise solution is 86.7%.

TABLE 1

Optimization Results under Different Optimization Objectives

| Optimization objective | Comprehensive income/Ten Thousand Yuan | Comprehensive energy utilization rate/% |
|---|---|---|
| Comprehensive income maximization | 4.29 | 82.4 |
| Comprehensive energy utilization rate maximization | 2.59 | 90.0 |
| Optimal compromised solution of multi-objective operation | 3.86 | 86.7 |

It can be seen from Table 1 that comparing the optimization results of the comprehensive income maximization and that of the optimal compromised solution of the multi-objective operation, the comprehensive income of the micro energy grid is reduced, but the comprehensive energy utilization rate of the micro energy grid is increased, and the micro energy grid operation is more efficient and environmentally friendly. Comparing the optimization results of the comprehensive energy utilization rate maximization and that of the optimal compromise solution of the multi-objective operation, the comprehensive energy utilization rate of the micro energy grid is reduced, but the comprehensive income of the micro energy grid is increased, and the micro energy grid operation has more economic benefits. Thus, it can be seen that the two optimization objective values of the optimal compromise solution of the multi-objective operation are both better, so that the optimal compromise solution of the multi-objective operation can be used as a multi-objective optimized scheduling solution of the micro energy grid, and it can effectively increase the economic gains and efficiency of the micro energy grid operation.

The above embodiments are the preferred embodiments of the proposed invention, but the embodiments of the present invention are not limited by the above. Any other modifications, decorations, substitutions, combinations, and simplifications made without departing from the spiritual essence and principle of the present invention should be equivalent substitute methods, and should be included in the scope of protection of the proposed invention.

What is claimed is:

1. A multi-objective operation control method for a micro energy grid, wherein the method comprises:
   (1) establishing optimization objectives of the micro energy grid, which comprises comprehensive income maximization and comprehensive energy utilization rate maximization;
   (2) using GAMS software to solve for an optimal solution and a worst solution for each optimization objective;
   (3) processing the optimization objectives by means of a weighting method; uniformly changing a weighting coefficient, and acquiring a Pareto frontier by the GAMS software;
   (4) acquiring reference satisfaction levels of Pareto optimal solutions according to a fuzzy membership degree, and selecting the Pareto optimal solution with a maximum reference satisfaction level as an optimal compromise solution; and
   (5) executing scheduling of the micro energy grid according to the optimal compromise solution,
   wherein the comprehensive income $f_1$ comprises an energy service income $C_{Ser}$, an energy trade income $C_{Trade}$, an operation and maintenance cost $C_{OM}$ and a carbon tax cost $C_{CO2}$:

$$f_1 = C_{Ser} + C_{Trade} - C_{OM} - C_{CO2}$$

$$\begin{cases} C_{Ser} = \sum_{t=1}^{T}(c_{e,t}L_{e,t} + c_{h,t}L_{h,t} + c_{g,t}L_{g,t})\Delta t \\ C_{Trade} = \sum_{t=1}^{T}\left(c_{e,t}^{sell}S_{e,t}^{sell} - c_{e,t}^{buy}S_{e,t}^{buy} - c_{g}^{buy}S_{g,t}^{buy}\right)\Delta t \\ C_{OM} = \sum_{t=1}^{T}\left[\sum_{n=1}^{N}c_{d,n}P_{n,t}^{in} + \sum_{k=1}^{K}c_{s,k}(Q_{k,t}^{dis} + Q_{k,t}^{ch})\right] \\ C_{CO2} = \sum_{t=1}^{T}c_c(a_e S_{e,t}^{buy} + a_g S_{g,t}^{buy})\Delta t \end{cases}$$

wherein $\Delta t$ is an optimization time interval, and T is a total optimization time period; $L_{e,t}$, $L_{h,t}$ and $L_{g,t}$ are powers of electricity, heat and natural gas of a user during a time period t respectively, and a value range of t is 1 to T; $c_{e,t}$, $c_{h,t}$ and $c_{g,t}$ are prices of electricity, heat and natural gas services respectively provided by the micro energy grid to the user during the time period t; Sbuy e,t, Ssell e,t and Sbuy g,t are a power of electricity bought from an electricity grid by the micro energy grid and a power of electricity sold to the electricity grid from the micro energy grid and a power of the natural gas bought from a gas grid respectively during the time period t; cbuy e,t, csell e,t and cbuy g,t are a price of electricity bought from the electricity grid by the micro energy grid and a price of electricity sold to the electricity grid from the micro energy grid and a price of the natural gas bought from a gas grid respectively during the time period t; N is a total number of energy conversion devices; K is a total number of energy storage devices; $c_{d,n}$ and $C_{s,k}$ are operation and maintenance coefficients of an $n^{th}$ energy conversion device and an $k^{th}$ energy storage device respectively, a value of n is 1 to N, and a value of k is 1 to K; Pin n,t, Qch k,t and Qdis k,t are an input power of the $n^{th}$ energy conversion device and charging and discharging power of the $k^{th}$ energy storage device respectively during the time period t; $a_e$ and $a_g$ are respectively $CO_2$ emission coefficients of electricity and natural gas; and $c_c$ is an unit carbon emission cost.

2. The multi-objective operation control method for the micro energy grid according to claim 1, wherein the comprehensive energy utilization rate $f_2$ is:

$$f_2 = \frac{\sum_{t=1}^{T}(L_{e,t} + L_{h,t} + L_{g,t} + S_{e,t}^{sell})}{\sum_{t=1}^{T}(S_{e,t}^{buy} + S_{g,t}^{buy} + W_{e,t})}$$

where $W_{e,t}$ is an generated output of wind electricity during the time period t.

3. The multi-objective operation control method for the micro energy grid according to claim 1, wherein step (3) comprises:
   (3-1) standardizing the optimization objectives $f_1$ and $f_2$, and executing weighting processing to acquire an optimization objective function:

$$\max\left[w\frac{f_1 - F_1^{min}}{F_1^{max} - F_1^{min}} + (1-w)\frac{f_2 - F_2^{min}}{F_2^{max} - F_2^{min}}\right]$$

wherein Fmax 1 and Fmin 1, as well as Fmax 2 and Fmin 2 respectively are the optimal solutions and the worst solutions of the optimization objectives $f_1$ and $f_2$; w is a weight of the optimization objective $f_1$, and a value range of w is [0,1]; and (1-w) is a weight of the optimization objective $f_2$;
   (3-2) uniformly taking J values of the weighting coefficient w in the range of [0,1], wherein J is a set value; and
   (3-3) for each weighting coefficient value, acquiring Pareto optimal solutions of the optimization objective function in step (3-1) by the GAMS software, and J Pareto optimal solutions forming the Pareto frontier.

4. The multi-objective operation control method for the micro energy grid according to claim 1, wherein the fuzzy membership degree is:

$$\gamma_{i,j} = \frac{F_i^{max} - f_{i,j}}{F_i^{max} - F_i^{min}}$$

wherein $f_{i,j}$ and $\gamma_{i,j}$ respectively are an objective function value and a fuzzy membership degree of an $i^{th}$ optimization objective of a $j^{th}$ Pareto optimal solution, a value range of i is 1 or 2, and a value range of j is 1 to J; and the reference satisfaction level of the Pareto optimal solution is:

$$\zeta_j = \frac{\sum_{i=1}^{2}\gamma_{i,j}}{\sum_{j=1}^{J}\sum_{i=1}^{2}\gamma_{i,j}}$$

wherein $\zeta_j$ is a reference satisfaction level of the $j^{th}$ Pareto optimal solution.

* * * * *